May 14, 1935.    G. PLATO    2,000,984
ROTARY FLUID DRIVEN MOTOR
Filed June 15, 1931    2 Sheets-Sheet 1
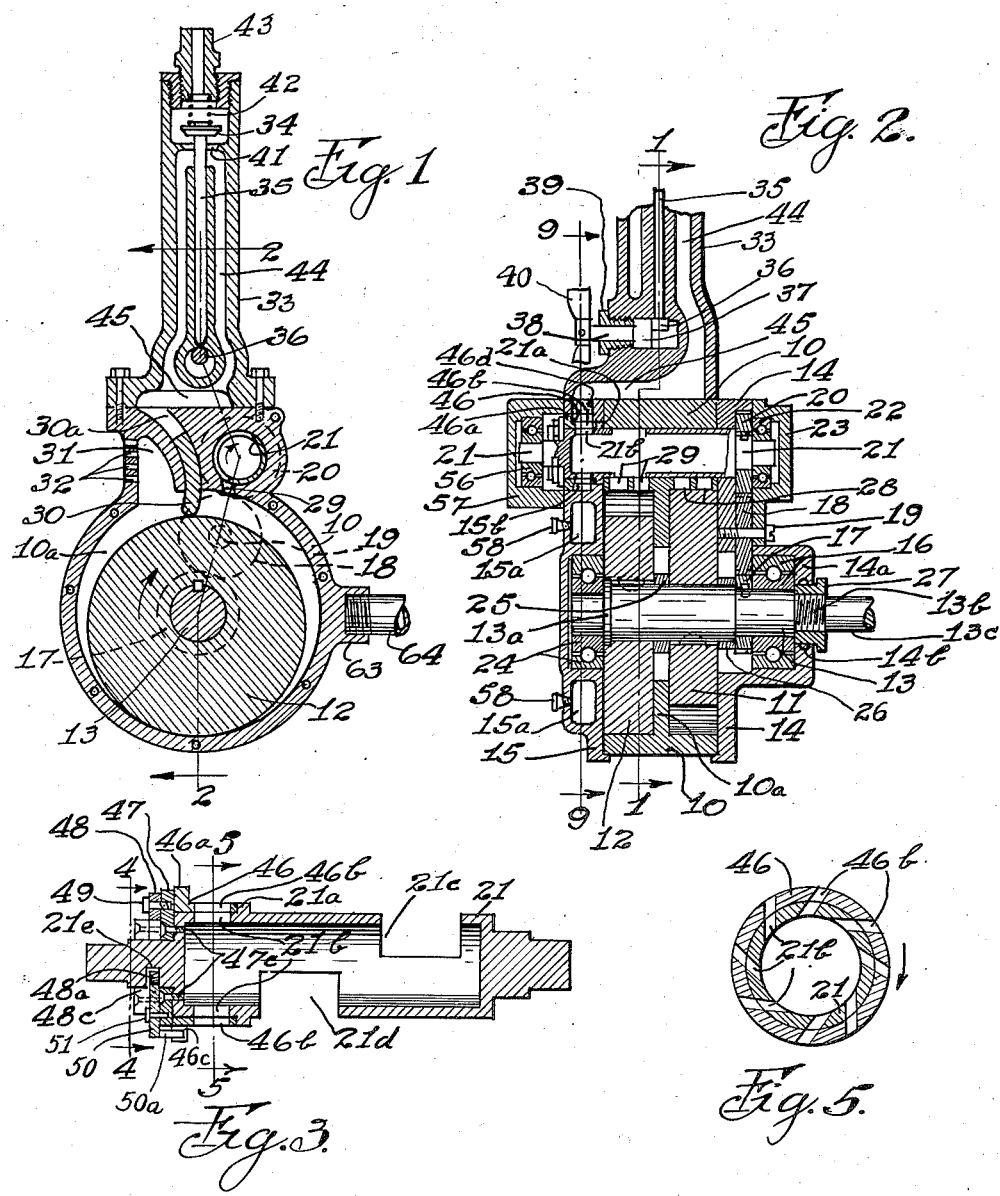
INVENTOR.
GERHARDT PLATO
BY Albert C. Bell
ATTORNEY.

May 14, 1935.  G. PLATO  2,000,984
ROTARY FLUID DRIVEN MOTOR
Filed June 15, 1931  2 Sheets-Sheet 2
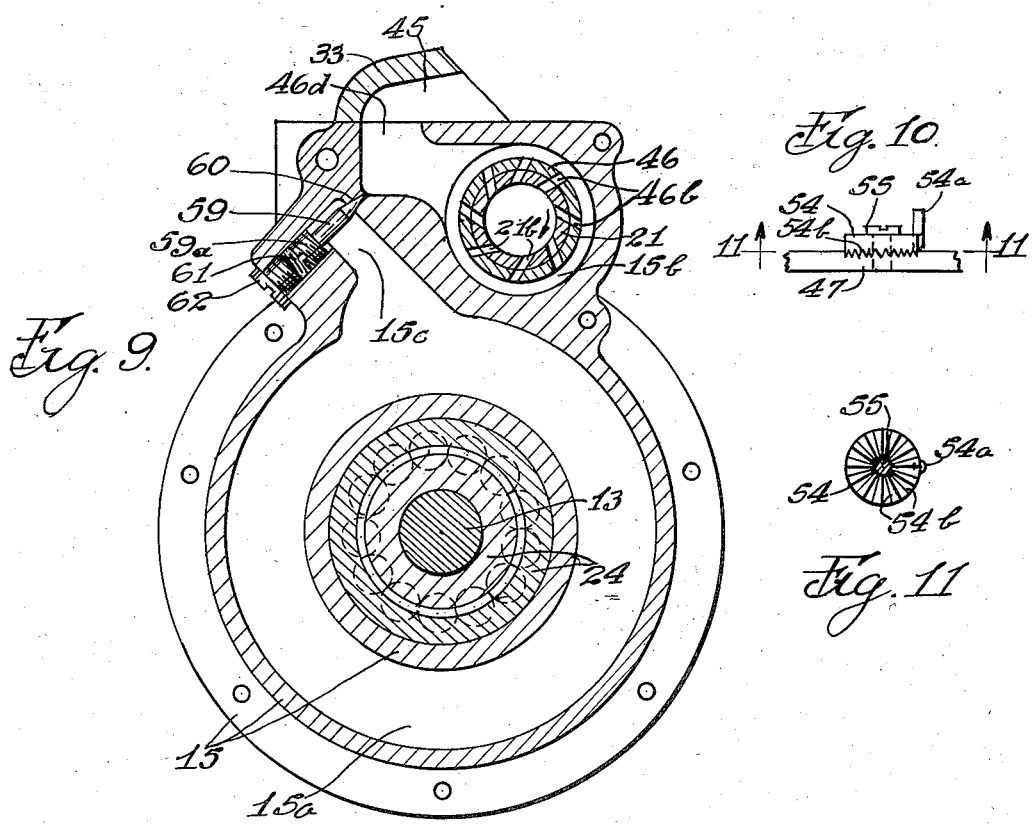
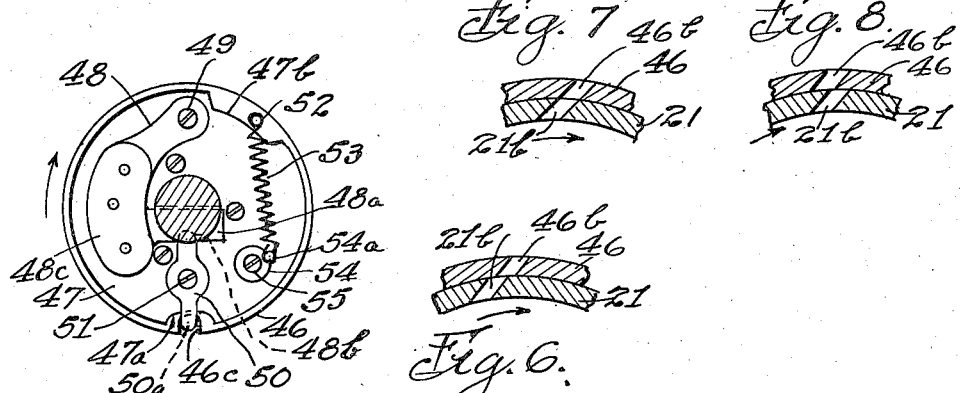
INVENTOR.
GERHARDT PLATO
BY Albert E. Bell
ATTORNEY.

Patented May 14, 1935

2,000,984

UNITED STATES PATENT OFFICE 2,000,984

ROTARY FLUID DRIVEN MOTOR

Gerhardt Plato, Chicago, Ill.

Application June 15, 1931, Serial No. 544,546

3 Claims. (Cl. 137—142)

My invention pertains to an improved construction of motor adapted to be driven by fluid under pressure, my construction pertaining particularly to governing devices for maintaining the speed of the motor practically constant for wide variations of load on the motor, and also to novel oiling devices for the motor.

My invention will best be understood by reference to the accompanying drawings showing a preferred embodiment thereof, in which Fig. 1 is a vertical, sectional view through the motor, taken transversely of the shaft thereof, this view being taken along the line 1—1 in Fig. 2, Fig. 2 is a vertical, sectional view taken longitudinally through the shaft of the motor, this view being taken along the line 2—2 in Fig. 1.

Fig. 3 shows in a view similar to Fig. 2 and to an enlarged scale, the valve and governing mechanism employed to control the operation of the motor, Fig. 4 is a sectional view to a further enlarged scale of the governing mechanism shown in Fig. 3, taken along the line 4—4, Fig. 5 is a sectional view of the parts shown in Fig. 3, to a further enlarged scale, taken along the line 5—5, Figs. 6, 7 and 8 show in views similar to Fig. 5 and to a further enlarged scale, the relation of the ports controlled by the governing mechanism, for the starting condition of the motor, for its full load condition, and for its idling condition when being driven at maximum speed without load, respectively, Fig. 9 is a sectional view to an enlarged scale of the parts shown in Fig. 2 taken along the line 9—9, Fig. 10 is a side elevation to a further enlarged scale, of the spring adjusting mechanism of the governing devices shown in Fig. 4, and Fig. 11 is a sectional view of the parts shown in Fig. 10 taken along the line 11—11.

Similar numerals refer to similar parts throughout the several views.

As shown in Figs. 1 and 2, my motor consists of a casing 10 provided with end bores forming cylinders, in which pistons 11 and 12 eccentrically mounted on the motor shaft 13 are rotatable, in such a manner that the part of greatest diameter of each piston is always in sliding engagement with the cylindrical portion of its bore, the pistons being separated from each other by a partition 10a forming a part of the casing 10. The pistons 11 and 12 are enclosed by end plates 14 and 15 respectively, the end plate 14 having an extending portion 14a around the shaft 13, to contain a ball bearing 16 to support one end of the shaft. The shaft 13 has secured thereto between the ball bearing 16 and the piston 11, a gear 17 meshing with an idling gear 18 supported for rotation on a stud 19 mounted in the end plate 14, which idling gear 18 in turn meshes with a gear 20 secured to a tubular valve member 21 mounted for rotation in a cylindrical bore in the upper part of the casing 10, which bore is substantially parallel with the bores in the body portion to receive the pistons 11 and 12. As a result of the gearing described, the valve member 21 is rotated at the same speed and in the same direction as the shaft 13. The valve member 21 is provided adjacent the gear 20, with a ball bearing 22 supported in a cap 23 secured in any suitable manner not shown, to the outer surface of the end plate 14, which cap also supports the outer end of the stud 19.

The other end of the shaft 13 is supported by a ball bearing 24 carried by the end plate 15. Adjacent the bearing 24, the shaft 13 is provided with a flange 13a contained in a corresponding counterbore in the piston 12. The pistons 11 and 12 are keyed to the shaft 13, as indicated, and are preferably displaced 180° from each other angularly. The pistons are held in properly spaced relation to engage the partition 10a with a sliding fit, by a spacing collar 25, and the space between the gear 17 and the piston 11 contains a second spacing collar 26. The shaft 13 outside of the bearing 16 is threaded as indicated at 13b, where it is engaged by an internally threaded sleeve 27, the inner end of which presses against the inner portion of the ball bearing 16, so that when the sleeve 27 is screwed tightly against the bearing 16, the pistons 11 and 12 are positively held against longitudinal movement on the shaft 13, and the inner portion of the bearing 16, is also securely held against similar longitudinal movement. The outer surface of the sleeve 27 is cylindrical and a sliding fit in a bore therefore in the extension 14a of the end plate 14, which bore is preferably provided with a recess 14b for packing material, to retain lubricant in the bearing 16 and prevent dust and dirt entering said bearing. Outside of the threaded portion 13b, the shaft 13 is extended as indicated at 13c for connection with a load to be driven.

Between the tubular valve 21, and the bores for the pistons 11 and 12, ports 28 and 29 are formed in the casing 10, to communicate fluid under pressure for example air, to the bores containing the pistons, during time intervals controlled by the valve 21, to rotate the pistons in the direction indicated in Fig. 1.

As shown in Fig. 1, a curved gate 30 is mounted in a corresponding groove in the upper part of the casing 10, to divide the clearance space between the piston 12 and the cylindrical surface of its bore into two parts, so that after the portion of greatest diameter of the piston 12 passes the gate 30, air under pressure may be admitted in front of the gate 30 through the ports 29 by the tubular valve 21, producing rotation of the piston and the shaft in the direction indicated, at which time air under pressure in the bore from a preceding cycle of operation, is retained back of the gate 30 and directed by it into a passageway 31 communicating with a plurality of apertures 32 through the wall of the casing 10, opening to atmosphere, which apertures provide for the free exhaust of the air back of the gate 30, as the portion of greatest diameter of the piston 12 approaches the gate 30.

The top part of the casing 10 has secured thereto a handle 33 provided with a valve 34 carried by a valve stem 35, the lower end of which stem is in line with a crank 36, which as more clearly shown in Fig. 2, is carried by the cylindrical head 37 of an operating rod 38 extending through a screw bushing 39, and having secured to its outer end a laterally extending member 40, by which the head 37 and crank 36 may be conveniently rotated to raise the valve stem 35, when it is desired to operate the motor. When the head 37 is turned to permit the valve 34 to engage its seat 41, the valve closes under the action of a spring 42 mounted between the valve member 34 and a hose connection 43 inserted in the outer end of the handle 33. The handle 33 is provided with a cored passageway 44, permitting air entering under the valve 34 to flow freely through the handle to a clearance space 45 formed in the inner end portion of the handle adjacent the outer surface of the casing 10, which clearance space communicates as indicated, with the groove 30a formed in the casing 10 to mount the gate 30. In this manner whenever the motor is in operation by opening the valve 34, air under pressure is communicated to the upper edge of the gate 30 and the pressure thereby produced on the gate 30, holds it firmly against the outer surface of the piston 12. The piston 11 is provided with a similar gate, similarly mounted in the casing 10 and similarly subjected to the air pressure in the clearance space 45.

As shown in Fig. 2, the tubular valve member 21 extends beyond the casing 10 at its left hand end, and through a bore therefor in the end plate 15. Adjacent the outer surface of the casing 10, the valve member 21 is provided with an outwardly extending flange 21a, the bore in the end plate 15 being a sliding fit on the outer surface of said flange. The portion of the valve member 21 outside of the flange 21a, has mounted thereon, a sleeve 46 of substantially the same external diameter as the flange 21a, and provided at its left hand end as shown in Fig. 2, with a flange 46a, the outer end surface of the flange 46a being substantially in line, preferably, with the outer surface of the end plate 15. The valve member 21 is provided with ports 21b co-operating with ports 46b in the sleeve 46 so that angular movement of the sleeve 46 relatively to the valve member 21, determines the amount of air admitted to the interior of the valve member 21, when the motor is in operation.

As more clearly shown in Fig. 3, the valve member 21 is provided with opposite ports 21c and 21d, for communication with the ports 28 and 29 respectively, at proper times to produce operation of the pistons 11 and 12 in the manner above described, the ports 21c and 21d being preferably of such a size and so disposed angularly that air under pressure is admitted in front of each of the gates when the portion of the corresponding piston of largest diameter has passed the gate, this communication of air under pressure being preferably contiued until the piston has made substantially half a rotation, at which time the supply of compressed air is preferably interrupted, to prevent retarding the operation of the motor by back pressures that would be developed if air under pressure were communicated to the space in front of the gate longer than described. The tubular valve 21 thus provides a means by which any desired timing of admission and cut off of air under pressure, may be secured. Adjacent the flange 46a, a plate 47 is secured to the valve member 21 in any convenient manner, for example by screws 47c as indicated in Fig. 3, the plate serving to hold the sleeve 46 in place on the valve member 21, so that it may be freely moved angularly on the valve member by the governing devices.

As more clearly shown in Fig. 4, an arm 48 is pivotally connected with the plate 47 at 49, and extends around the adjacent portion of the valve membed 21, and just below the axis of said valve member, the arm is provided with a lateral extension 48a extending through a slot 21e formed through the adjacent portion of the valve member 21, to receive it. The lower edge of the extension 48a, is provided with a notch 48b engaging the upper end of a lever 50 pivotally secured to the plate 47 at its mid portion as indicated at 51. The lower end of the lever 50, is provided with an arm 50a extending from the lever towards the flange 46a, through a clearance opening 47a in the adjacent edge portion of the plate 47, so that the arm 50a may engage a slot 46c in the flange 46a. The parts just described are so related that movement of the arm 48 on its pivotal support 49, rocks the lever 50 on its pivotal support 51 and imparts angular movement to the flange 46a and sleeve 46, relatively to the plate 47 and valve member 21. The arm 48 has rigidly secured thereto, for example by riveting, a weight 48c, the arm and weight being so proportioned and shaped, that rotation of the plate 47 with the valve member 21, in the direction indicated by the arrow, tends to move the weight and arm outwardly away from the axis of the valve member. The flange 46a carries a pin 52 extending laterally from the flange through a clearance opening 47b in the plate 47, to engage one end of a spring 53, the other end of which is connected with a lug 54a extending eccentrically from a disk 54 secured to the plate 47 by a clamping screw 55 as indicated. The spring 53 tends to move the flange 46a and sleeve 46 angularly relatively to the plate 47, in a direction to move the arm 48 and the weight 48c towards the end portion of the valve member 21, against the centrifugal force which may be exerted on the arm 48 at any time, by rotation of the arm 48 and the weight 48c with the plate 47. The lug 54a extends from the edge portion of the disk 54, so that turning the disk from one position to another on the plate 47, by loosening the screw 55, affords a convenient means for adjusting the tension of the spring 53, so that the control exerted by the governing mechanism may be as desired. Outside of the governing mechanism, the valve member 21, as shown in Fig. 2, has a ball bearing 56 to support the left hand end of the valve member for free rotary movement, said ball bearing 56 being supported by a cap 57, which cap is secured to the end plate 15 in any convenient manner not shown, for example by screws, said cap also surrounding and enclosing the governing mechanism described. As indicated in Fig. 2, the end plate 15 is preferably cored around the bearing 24 as indicated at 15a, to form an oil receptacle provided with screw plugs 58 to afford access to the receptacle as desired, the oil serving to lubricate the motor in a manner to be described. As shown in Fig. 2, the bore in the end plate 15 around the sleeve 46, forms a clearance space 15b around said sleeve in communication with the ports 46b in the sleeve 46, said clearance space being in communication with a port 46d opening through the upper surface of the end plate 15 and communicating with the clearance space 45 in the lower end of the handle 33, as a result of which, when the valve 34 is open, air under pressure is communicated to the clearance space 15b, to supply compressed air to the interior of the valve member 21 according to the position of the sleeve 46 on the valve member 21 at the time.

As shown in Fig. 5, the ports 46b in the sleeve 46 are inclined towards the direction of motion of the sleeve indicated by the arrow, and the ports 21b in the valve member 21 are similarly inclined. This construction I find greatly increases the efficiency of operation of the motor, since the inclined ports tend to draw the air from the clearance space 15b and force it through the ports into the interior of the valve member 21, instead of setting up a back pressure on the air flow, which result occurs where radially extending ports are used. In adjusting the governing mechanism, the sleeve 46 is preferably adjusted so that the ports 46b and 21b will occupy the relation to each other for different operating conditions of the motor, shown in Figs. 6, 7 and 8. In Fig. 6 one of the ports 46b is shown in the relation it occupies to the corresponding port 21b when the motor is at rest, and at the instant the valve 34 is opened. As soon as the motor reaches its normal working speed, the action of the governing mechanism described, produces relative movement between the sleeve 46 and the valve member 21 moving the ports 46b and 21b into alignment with each other, which is the condition for full load operation of the motor. If and when the load on the motor is removed, with the valve 34 in its open position, the tendency of the motor to increase its speed, acts on the governing mechanism described, to move the sleeve 46 angularly relatively to the valve member 21 to the position illustrated in Fig. 8, so that the port 21b is nearly closed by the sleeve 46, the amount of opening being just sufficient to drive the motor without load, at a speed slightly greater than its speed under full load. In considering the movement of the ports 46b relatively to the ports 21b by the governing mechanism in the manner described, it will be observed that the valve member 21 is the part that is positively driven by the motor, the sleeve 46 being the part that is driven through the governor mechanism above described between the valve member and the sleeve. Bearing this in mind, it will be observed, that the inertia of the sleeve 46, for changes in speed of the valve member 21, always tends to produce relative movement between the sleeve and valve member, in the same direction that the governor mechanism at that time operates to produce relative movement between these parts. As shown in Fig. 6, the port 46b leads the port 21b sufficiently so that the net opening of the port 21b permits sufficient air to flow to positively start the motor. As the valve member 21 accelerates, the tendency of the sleeve 46 due to its inertia, is to lag behind the movement of the valve member 21, which is precisely the relative movement imparted to the sleeve by the governing mechanism, due to the acceleration of the valve member 21, until the ports 46b and 21b are in alignment as shown in Fig. 7, at which time the motor will be operating at maximum speed for full load. Again, if while working at the full load speed of the motor for which the governing mechanism is adjusted, the load is removed from the motor, the resultant acceleration of the valve member 21 tends to move the valve member ahead of the sleeve 46 due to the inertia of the sleeve 46, which again is exactly the movement imparted to the sleeve 46 relatively to the valve member 21, by the governing mechanism, this relative movement continuing, until the resulting net opening of the port 21b is just sufficient to drive the motor at a speed slightly greater than the maximum full load speed of the motor. With the motor running idle as described, if a load is suddenly applied to the motor, the deceleration of the valve member 21 results in a tendency of the sleeve 46 to move ahead of the valve member 21, due to the inertia of the sleeve 46, which is again just the nature of relative movement produced between the sleeve 46 and valve member 21 by the governing mechanism.

As shown in Figs. 10 and 11, the disk 54 is preferably provided on its surface adjacent the plate 47, with radial ridges or teeth 54b for engagement with similar teeth on the plate 47, the teeth being preferably of small pitch, so that when the screw 55 is tightened for any adjustment of the disk 54, the engagement of the teeth referred to, prevents turning movement of the disk 54 on the plate 47.

As a result of the direction of movement of the sleeve 46 due to its inertia and due to the governing mechanism, relatively to the valve member 21, for speed changes of the valve member 21, I find that the amount of sleeve turning effort required to be developed by the governing mechanism, is very much less than is the case where the movement imparted to the governed member is in a direction opposite to its inertia tendency for the speed changes producing operation by the governing mechanism. As a result, I am able to govern the motor within very close limits of operation.

As shown in Fig. 9, the cored space 15a surrounding the bearing 24 in the end plate 15, is provided with an upper extension 15c through which a needle valve 59 extends, the tapered end of which needle valve engages a seat 60 forming a communicating passageway between the extension 15c and the port 46d. The valve 59 is provided with a threaded head 59a engaging a threaded bore 61, so that by turning the needle valve 59 it may be moved into and from the tapered valve seat 60 as desired, and thus establish a desired degree of opening between the extension 15c and the port 46d. Oil is placed in the compartment 15a and movement of the motor results in the oil finding its way into the extension 15c and around the needle valve, and to the extent permitted by its opening, into the port 46d. Since all of the air flowing to the motor passes through the port 46d, the oil is picked up by the air stream and serves to lubricate any of the moving parts with which the air comes in contact. The needle valve 59 is of a length such that the outer end of the threaded head 59a is a substantial distance within the outer surface of the threaded bore 61, and the outer end of said bore is closed by a flanged screw 62 which tightly engages the surface of the end plate 15 adjacent the bore 61, to prevent leakage of oil through said bore and from the casing, whatever may be the adjustment of the needle valve 59. Besides tightly closing the bore 61, the screw 62 insures against tampering with the needle valve 59, thus reasonably assuring that the needle valve will be retained in its adjustment, once it is properly set.

The motor above described is intended for portable use, and to facilitate handling it, I preferably provide the casing 10 with a threaded boss 63 extending radially from it, to receive a correspondingly threaded handle 64, the handle 64 being at such an angle to the handle 33, that the motor may be positively held by the operator in connection with any work the motor is required to do. I do not however, limit my invention to portable motors, as it is equally applicable to fluid operated motors generally, of the rotary type, regardless of the specific construction of the pistons and parts directly associated with them.

While the illustrative motor is above described as operated by air under pressure, I do not limit myself to that driving medium, as fluid of any kind, capable of exerting pressure on the piston or pistons, may be employed as desired. It will also be understood that the motor may contain any number of pistons desired, related angularly in any desired manner.

While I have shown my invention in the particular embodiment above described, it will be understood that I do not limit myself to this exact construction as I may employ equivalents known to the art at the time of the filing of this application without departing from the scope of the appended claims.

What I claim is:

1. Mechanism for controlling the supplying of fluid under pressure to a motor operated by said fluid, consisting of a rotary valve cyclically controlling the flow of driving fluid to the motor, and driven continuously by the motor proportionally to the speed thereof, a member mounted on said valve and rotatable synchronously with said valve for constant speed of said motor and movable relatively to said valve within governing limits for changes in speed of said motor, and governor mechanism having rotation corresponding to rotation of said valve and connected with said member and moving said member relatively to said valve for speed changes of said valve, said valve having ports controlled as to size by said relative movement of said member, said governor mechanism comprising an arm carried by said valve for outward movement centrifugally, a lever pivotally supported at its mid portion by said rotary valve and at one end engaging said arm, operating connections between the other end of said lever and said member, and a spring opposing outward movement of said arm.

2. Mechanism for controlling the supplying of fluid under pressure to a motor operated by said fluid, consisting of a rotary valve cyclically controlling the flow of driving fluid to the motor, and driven continuously by the motor proportionally to the speed thereof, a member mounted on said valve and rotatable synchronously with said valve for constant speed of said motor and movable relatively to said valve within governing limits for changes in speed of said motor, and governor mechanism having rotation corresponding to rotation of said valve and connected with said member and moving said member relatively to said valve for speed changes of said valve, said valve having ports controlled as to size by said relative movement of said member, said governor mechanism comprising an arm carried by said valve for outward movement centrifugally, a lever pivotally supported at its mid portion by said rotary valve and at one end engaging said arm, operating connections between the other end of said lever and said member, and a spring opposing outward movement of said arm, said connections between said arm and said member moving said member relatively to said valve by said arm movement, in the same direction as the inertia tendency of said member for the corresponding speed change of said valve.

3. Governing mechanism for controlling the effective port opening of a ported cylindrical valve having continuous rotation, comprising a port controlling member rotatable with said valve and also capable of movement relatively to said valve, said valve having a portion ported to cooperate with said port controlling member, and governor mechanism rotatable with said valve, said governor mechanism comprising an arm mounted for rotation and for outward movement centrifugally, a lever pivotally supported at its mid portion by said valve and at one end engaging said arm, operating connections between the other end of said lever and said member, and a spring opposing outward movement of said arm.

GERHARDT PLATO.